(12) United States Patent
Yoshida et al.

(10) Patent No.: US 9,581,204 B2
(45) Date of Patent: Feb. 28, 2017

(54) MAGNETIC-SCALE-EQUIPPED MOTION GUIDE APPARATUS

(71) Applicant: THK CO., LTD., Tokyo (JP)

(72) Inventors: Akimasa Yoshida, Tokyo (JP); Hiroshi Kaneshige, Tokyo (JP); Takuya Horie, Tokyo (JP); Tetsuya Sakagami, Tokyo (JP); Yoshinobu Moriyuki, Tokyo (JP); Teruaki Ooka, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/915,745

(22) PCT Filed: Sep. 3, 2014

(86) PCT No.: PCT/JP2014/073225
§ 371 (c)(1),
(2) Date: Mar. 1, 2016

(87) PCT Pub. No.: WO2015/033969
PCT Pub. Date: Mar. 12, 2015

(65) Prior Publication Data
US 2016/0215825 A1 Jul. 28, 2016

(30) Foreign Application Priority Data

Sep. 9, 2013 (JP) .................................. 2013-186015

(51) Int. Cl.
*F16C 29/06* (2006.01)
*F16C 41/00* (2006.01)
(Continued)

(52) U.S. Cl.
CPC .......... *F16C 41/007* (2013.01); *F16C 29/005* (2013.01); *F16C 29/06* (2013.01);
(Continued)

(58) Field of Classification Search
CPC .... F16C 29/005; F16C 29/06; F16C 29/0602; F16C 29/08; F16C 29/082; F16C 29/084; F16C 41/007
See application file for complete search history.

(56) References Cited

U.S. PATENT DOCUMENTS 5,842,283 A * 12/1998 Yatsu .................... F16C 29/005
33/484
5,945,824 A * 8/1999 Obara ................... F16C 29/005
310/12.09
(Continued)

FOREIGN PATENT DOCUMENTS

DE 10243021 A1 * 3/2004 .............. B23Q 1/58
JP 03153915 A * 7/1991
(Continued)

OTHER PUBLICATIONS

International Search Report dated Nov. 25, 2014, issued in counterpart International Application No. PCT/JP2014/073225 (2 pages).

*Primary Examiner* — Phillip A Johnson
(74) *Attorney, Agent, or Firm* — Westerman, Hattori, Daniels & Adrian, LLP

(57) ABSTRACT

A magnetic-scale-equipped motion guide apparatus is provided which can scrape iron powder adhered to a magnetic scale by a scraper or seal of a movable member without inviting adverse effects such as wearing away and deformation of the magnetic scale. The magnetic-scale-equipped motion guide apparatus of the present invention comprises a track member 1 having a rolling element rolling portion 1*b* and also an upper surface where through holes 18 into which fastening members are inserted open, a movable member 2 movably assembled to the track member 1 via a plurality of rolling elements 3, a groove 1*a* formed in the track member 1 and extended in a longitudinal direction, a magnetic scale 7 accommodated in the groove 1*a* and having north and south poles alternately formed in the longitudinal direction, (Continued)

and a cover member 8 that covers the magnetic scale 7 and also the through holes 18 of the track member 1.

6 Claims, 9 Drawing Sheets

(51) Int. Cl.
*F16C 29/00* (2006.01)
*F16C 29/08* (2006.01)

(52) U.S. Cl.
CPC .......... *F16C 29/0602* (2013.01); *F16C 29/08* (2013.01); *F16C 29/082* (2013.01); *F16C 41/00* (2013.01)

(56) References Cited

U.S. PATENT DOCUMENTS 6,253,453 B1 7/2001 Tsukada
6,333,628 B1 * 12/2001 Yeh ...................... F16C 29/005
310/12.19
2001/0016089 A1 8/2001 Mochizuki
2005/0076526 A1 4/2005 Greubel
2006/0169943 A1 * 8/2006 Yamaguchi .............. C08K 3/20
252/62.54
2008/0095479 A1 * 4/2008 Chen ...................... F16C 29/00
384/45

FOREIGN PATENT DOCUMENTS

| JP | 5-280915 A | 10/1993 | |
|---|---|---|---|
| JP | 7-279958 A | 10/1995 | |
| JP | 9-53638 A | 2/1997 | |
| JP | 2001-227542 A | 8/2001 | |
| JP | 2005-121215 A | 5/2005 | |
| JP | 4441525 B2 * | 3/2010 | ............ F16C 41/007 |
| JP | 2012-154431 A | 8/2012 | |

* cited by examiner

MAGNETIC-SCALE-EQUIPPED MOTION GUIDE APPARATUS

TECHNICAL FIELD

The present invention relates to a motion guide apparatus equipped to a machine tool or the like to guide linear or curvilinear motion of a movable body, and particularly relates to a magnetic-scale-equipped motion guide apparatus including a magnetic scale for detecting the position of a movable body.

BACKGROUND ART

A motion guide apparatus of this type is used to guide linear or curvilinear motion of a movable body. The motion guide apparatus includes a track rail extended in a longitudinal direction, a movable block movably assembled to the track rail via multiple rolling elements such as balls or rollers. A movable body is supported by the movable block. The rolling motion of the rolling element is used. Accordingly, it is possible to guide the motion of the movable body with high accuracy and obtain agile movements of the movable body.

In order to control the position of the movable body, it is necessary to measure the position of the movable body. In order to measure the position of the movable body, a scale is attached to the track rail, and a reading head that reads the scale is attached to the movable block or movable body. Scales are divided broadly into two types: an optical scale and a magnetic scale. The optical scale is a scale having a scale grating. A light emitting element and a light receiving device are used to detect a change in amount of light from the scale grating and output the amount of displacement. The magnetic scale is a scale having a fine magnetic pattern where the north and south poles are alternately arranged to detect the magnetic flux density of the magnetic pattern by a magnetometer such as a Hall sensor or a magnetoresistive element and output the amount of displacement.

The optical scale has an advantage that it is easy to increase measurement accuracy, but on the other hand, has a disadvantage that it is weak to contaminations such as dust and oil that block light. The magnetic scale has an advantage that it can be used even under an environment where there is dust, oil, or the like. In many cases, the motion guide apparatus is used under an environment where the advantage of the magnetic scale contributes largely. The magnetic scale is used for the motion guide apparatus in many cases.

As a motion guide apparatus where a magnetic scale is used, Patent Literature 1 discloses a motion guide apparatus that has a groove extended in a longitudinal direction in an upper surface of a track rail, a magnetic scale fitted into the groove, and a reading head attached to a movable block to read a magnetic pattern consisting of the north and south poles of the magnetic scale.

CITATION LIST

Patent Literature

Patent Literature 1: JP 09-53638 A

SUMMARY OF INVENTION

Technical Problem

However, the magnetic scale has the property of attracting iron. Accordingly, there is a problem that the magnetic scale automatically attracts surrounding iron powder. In a known magnetic-scale-equipped motion guide apparatus, a magnetic scale is provided, in a state of being exposed, to a groove in an upper surface of a track rail. Accordingly, there is a problem that iron powder is adhered to the upper surface and the widthwise side surfaces of the magnetic scale. If iron powder is adhered to the magnetic scale, the magnetic flux of the magnetic scale passes through the iron powder and is disturbed. Accordingly, measurement accuracy is reduced.

A movable block is provided with a scraper or seal that scrapes foreign substances on the upper surface of the track rail. However, if the scraper or seal is brought into contact with the magnetic scale with interference to scrape the iron powder on the upper surface of the magnetic scale, it invites adverse effects such as wearing away and deformation of the magnetic scale. Moreover, however much iron powder on the upper surface of the magnetic scale is scraped by the scraper or seal, the iron powder adhered to the side surfaces of the magnetic scale cannot be scraped off.

Hence, an object of the present invention is to provide a magnetic-scale-equipped motion guide apparatus that can scrape iron powder adhered to a magnetic scale by a scraper or seal of a movable member without inviting adverse effects such as wearing away and deformation of the magnetic scale.

Solution to Problem

In order to solve the problem, an aspect of the present invention is a magnetic-scale-equipped motion guide apparatus comprising: a track member including a rolling element rolling portion extended in a longitudinal direction, and an upper surface where a through hole into which a fastening member is inserted opens; a movable member movably assembled to the track member via a plurality of rolling elements; a groove formed in the track member and extended in the longitudinal direction; a magnetic scale accommodated in the groove, on which north and south poles are alternately formed in the longitudinal direction; and a cover member covering the magnetic scale and covering the through hole of the track member.

Advantageous Effects of Invention

According to the present invention, a cover member that covers a magnetic scale also serves as a cover member that covers through holes of a track member. Accordingly, iron powder adhered to the surface of the cover member can be scraped by a scraper and/or seal. The scraper and/or seal does not contact the magnetic scale directly. Accordingly, it is possible to prevent adverse effects such as wear and deformation on the magnetic scale.

DESCRIPTION OF EMBODIMENTS

Figure 1:
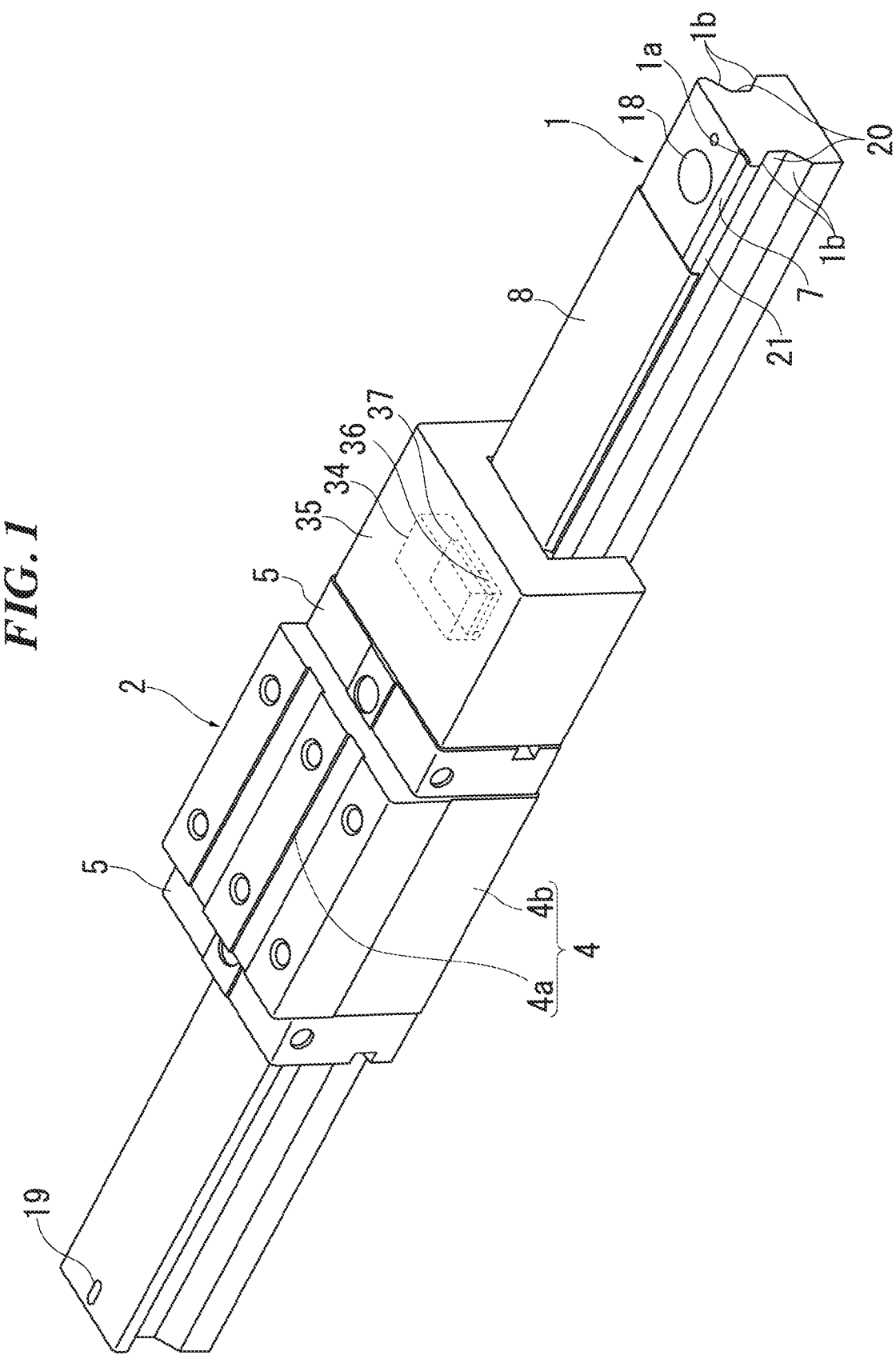
FIG. 1 is a perspective view of a motion guide apparatus of a first embodiment of the present invention.
Figure 2:
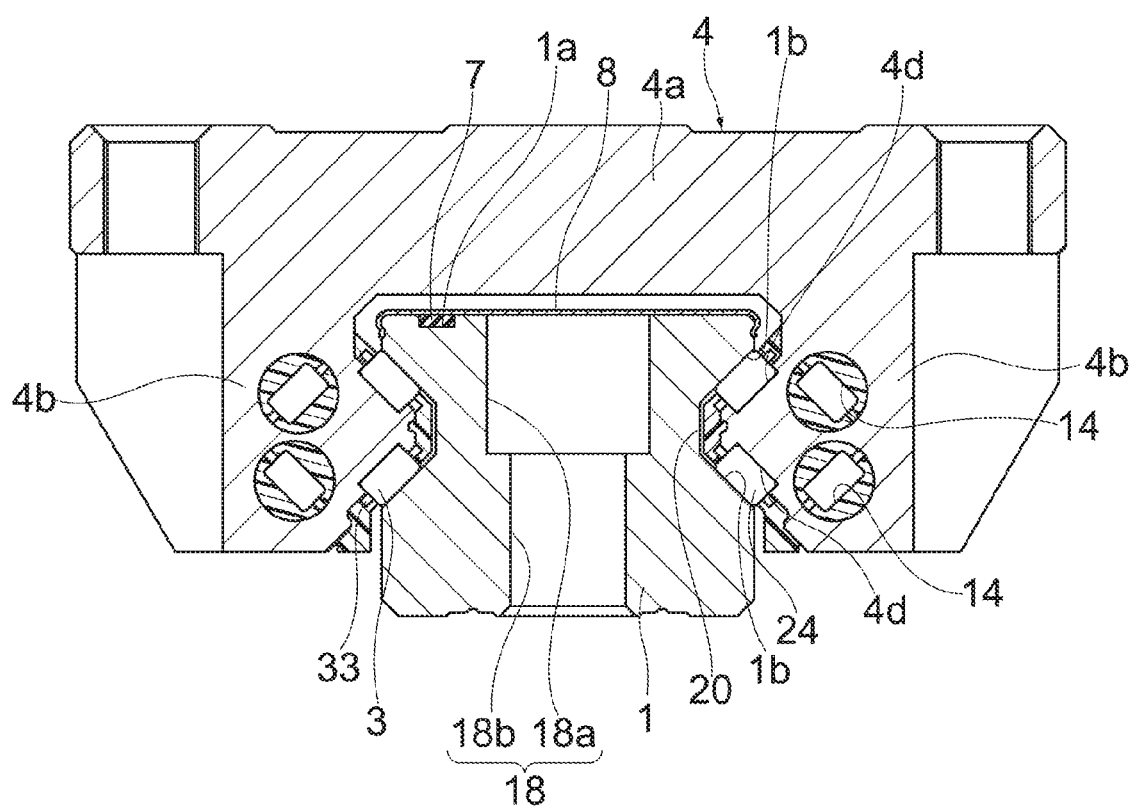
FIG. 2 is a cross-sectional view of the motion guide apparatus of the embodiment.

A magnetic-scale-equipped motion guide apparatus (hereinafter simply referred to as a motion guide apparatus) of an embodiment of the present invention is described in detail hereinafter based on the accompanying drawings. FIG. 1 illustrates a perspective view of a motion guide apparatus of a first embodiment of the present invention. FIG. 2 illustrates a cross-sectional view of the motion guide apparatus orthogonal to a longitudinal direction of a track rail 1.

The motion guide apparatus includes the track rail 1 as a track member extended linearly in the longitudinal direction, and amovable block 2 as a movable member assembled to the track rail 1 movably in the longitudinal direction via multiple rollers 3 as rolling elements. A groove 1a extended in the longitudinal direction is formed in an upper surface of the track rail 1. A magnetic scale 7 is fitted into the groove 1a. After the magnetic scale 7 is fitted into the groove 1a, the upper surface of the track rail 1 is covered with a plate cover 8 as a cover member.

The structures of the track rail 1, the plate cover 8, the magnetic scale 7, and the movable block 2 are described below in turn.

Firstly, the structure of the track rail 1 is described. A plurality of through holes 18 opens into the upper surface of the track rail 1 at regular spacing in the longitudinal direction. The plurality of through holes 18 is covered with the plate cover 8. FIG. 1 illustrates a state where the plate cover 8 is cut in the middle and one through hole 18 is exposed to illustrate the through hole 18. However, in reality the plate cover 8 is extended up to an end of the track rail 1 and covers all the through holes 18. A bolt as a fastening member for fixing the track rail 1 to a base is inserted into the through hole 18. As illustrated in the cross-sectional view of FIG. 2, a countersink portion 18a having a larger diameter than the head of the bolt and a hole 18b slightly larger than the threaded portion of the bolt are concentrically formed in the through hole 18. The height of the countersink portion 18a is made higher than the height of the head of the bolt to completely embed the bolt in the through hole 18.

Bolts are inserted into at least two of the plurality of through holes 18. When the bolt is caused to pass through the through hole 18 to be screwed into the base, the head of the bolt is mounted onto a seating surface of the countersink portion 18a of the track rail 1 to fix the track rail 1 to the base. When foreign substances are accumulated in the through hole 18, the foreign substances may enter the movable block 2 and hinder the smooth rolling of the roller 3. If the plate cover 8 covers the through holes 18, it is possible to prevent foreign substances from accumulating in the through holes 18.

As illustrated in FIG. 2, roller rolling surfaces 1b as rolling element rolling portions where the rolling elements make rolling motion are formed on the track rail 1. The track rail 1 has a substantially square shape in cross section. Left and right side surfaces of the track rail 1 are formed into V-shaped recesses 20. The roller rolling surfaces 1b are formed on inclined upper and lower wall surfaces of the recess 20 in a state where a bottom surface of the track rail 1 is placed on a horizontal surface (the state illustrated in FIG. 2). The left and right side surfaces of the track rail 1 have a total of four roller rolling surfaces 1b, two in each of the upper and lower sides. Each roller rolling surface 1b is extended long and thin along the longitudinal direction of the track rail 1. The track rail 1 is made of metal such as steel.

As illustrated in FIG. 1, the groove 1a extended in the longitudinal direction of the track rail 1 is formed in the upper surface of the track rail 1. The groove 1a is formed between the plurality of through holes 18 in the upper surface of the track rail 1 and a widthwise end 21 of the upper surface of the track rail 1. The groove 1a is away in the width direction from the plurality of through holes 18. As illustrated in the cross-sectional view of the track rail 1 of FIG. 3, the groove 1a includes a bottom surface 1a1 parallel to the upper surface of the track rail 1, and a pair of side surfaces 1a2 perpendicular to the bottom surface 1a1. The magnetic scale 7 is fitted into the groove 1a. A double-sided tape 9 is bonded to an undersurface of the magnetic scale 7. The double-sided tape 9 is a strip-shaped tape having bonding surfaces on both sides. An undersurface of the double-sided tape 9 is bonded to the bottom surface 1a1 of the groove 1a of the track rail 1. The height of the side surface 1a2 of the groove 1a is higher than that of the magnetic scale 7. There is a difference in height between an upper surface of the magnetic scale 7 and the upper surface of the track rail 1. In other words, there is a gap between the upper surface of the magnetic scale 7 and an undersurface of the plate cover 8.

Figure 3:
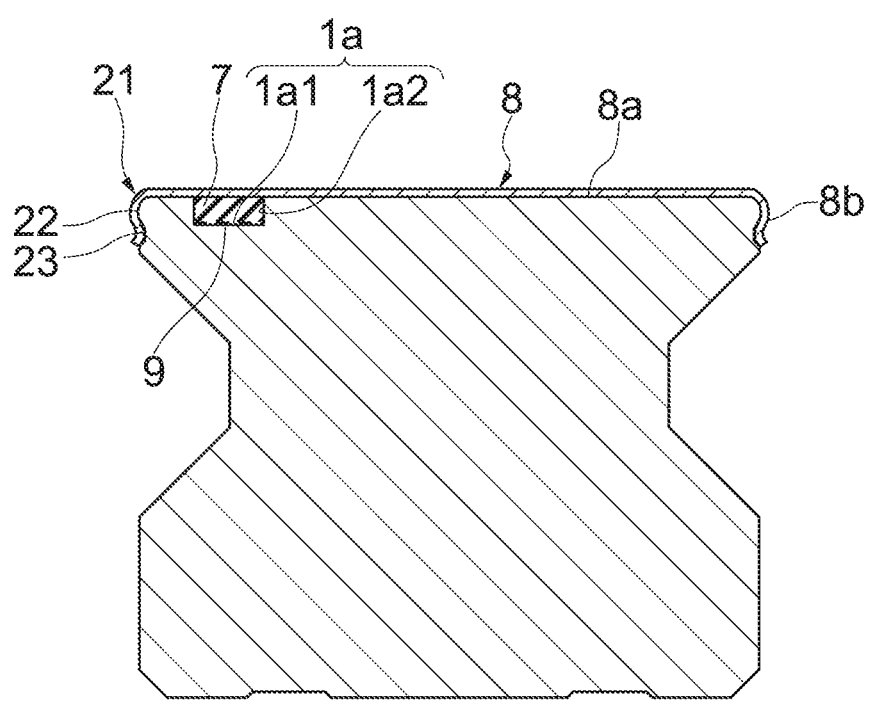
FIG. 3 is a cross-sectional view of a track rail of the motion guide apparatus of the embodiment.

Next, the structure of the plate cover 8 is described. As illustrated in FIG. 3, the plate cover 8 covers the upper surfaces of the magnetic scale 7 and the track rail 1. The plate cover 8 is made of non-magnetic metal, for example, stainless steel. The length of the plate cover 8 is equal to that of the track rail 1. The thickness of the plate cover 8 is set to, for example, 0.2 to 0.4 mm.

A curved portion 22 that curves outward drawing an arc is formed at the widthwise end 21 of the upper surface of the track rail 1. An undercut portion 23 that is continuous from a lower end of the curved portion 22 and is recessed toward the widthwise center is formed on the side surface of the track rail 1. The undercut portion 23 and the curved portion 22 keep their shapes the same all along the length of the track rail 1.

The plate cover 8 includes a central portion 8a that covers the upper surface of the track rail 1 along the entire width direction orthogonal to the longitudinal direction, and engagement portions 8b provided to both widthwise ends of the central portion 8a and bent along the central portion 8a. The plate cover 8 has a larger width than that of the groove 1a, and is mounted on the upper surface of the track rail 1. The central portion 8a of the plate cover 8 is flat, and is in contact with the upper surface of the track rail 1. The plate cover 8 simultaneously covers the magnetic scale 7 and the plurality of through holes 18 (refer to FIG. 2) in the upper surface of the track rail 1.

The plate cover 8 is pressed straight down while the engagement portions 8b of the plate cover 8 are pressed against the curved portions 22 of the track rail 1. The left and right engagement portions 8b deform elastically outward to climb over the curved portions 22. The engagement portions 8b are then fitted into the undercut portions 23. The plate cover 8 is fixed to the track rail 1 by the elastic forces of the engagement portions 8b. The shape of the engagement portion 8b of the plate cover 8 is not limited to the shape illustrated in FIG. 3 as long as the engagement portion 8b functions as a snap fit.

Figure 4A:
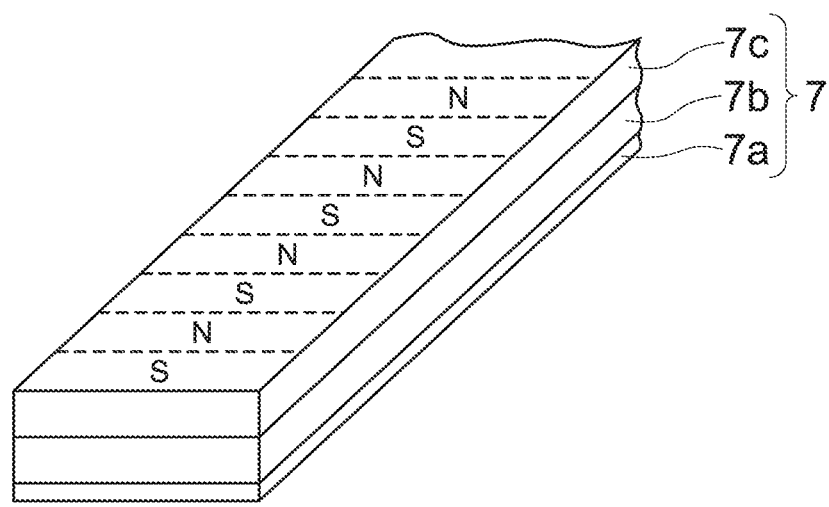
FIGS. 4(a) and 4(b) are detailed diagrams of a magnetic scale (FIG. 4(a) illustrates a perspective view of the magnetic scale, and FIG. 4(b) illustrates a cross-sectional view along a longitudinal direction of the magnetic scale).
Figure 4B:
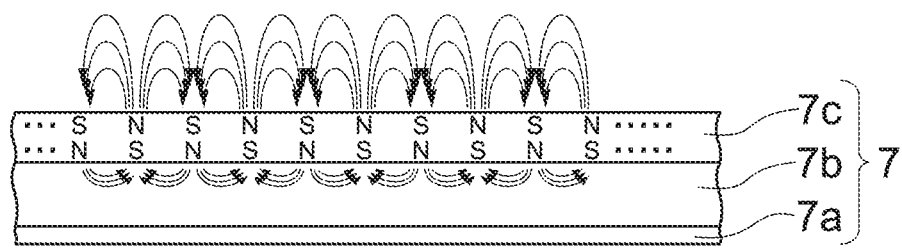

Next, the structure of the magnetic scale 7 is described. FIGS. 4(a) and 4(b) illustrate detailed diagrams of the magnetic scale 7. FIG. 4(a) illustrates a perspective view of the magnetic scale 7. FIG. 4(b) illustrates a cross-sectional view along a longitudinal direction of the magnetic scale 7. The magnetic scale 7 is the one also called a magnetic linear encoder. The north and south poles are alternately formed in the longitudinal direction on the surface of the magnetic scale 7. The magnetic scale 7 has a three-layer structure including a base plate 7a made of a non-magnetic stainless steel plate with a thickness of, for example, 0.3 mm on a bottom surface side, a first sheet 7b with a thickness of, for example, 0.5 mm on the base plate 7a, and a second sheet 7c with a thickness of, for example, 0.5 mm on the first sheet 7b. The width of the magnetic scale 7 is, for example, 4 mm.

The base plate 7a is provided to increase the strength of the magnetic scale 7. The double-sided tape 9 for fixing the magnetic scale 7 to the track rail 1 is bonded to an undersurface of the base plate 7a.

Ferrite magnetic powder is incorporated in a binder resin such as vulcanized rubber or elastomer to form the first sheet 7b into a strip rectangular plate. Powder of manganese-zinc ferrite, nickel-zinc ferrite, copper-zinc ferrite, or the like is used as the ferrite magnetic powder.

Rare-earth magnetic powder is incorporated in a binder resin such as vulcanized rubber or elastomer to form the second sheet 7c into a strip rectangular plate. The materials of the binder resin of the first sheet 7b and the second sheet 7c are the same. Powder of neodymium, samarium-cobalt, samarium-iron-nitride, or the like is used as the rare-earth magnetic powder. The first sheet 7b generates a higher magnetic flux density than that the second sheet 7c generates.

The magnetic scale 7 is produced through the following steps. Firstly, the first sheet 7b and the second sheet 7c are formed separately. Next, the first sheet 7b and the second sheet 7c are superimposed and then heated. The first sheet 7b and the second sheet 7c are welded together. Next, the surface of the second sheet 7c is magnetized alternately to the north pole and to the south pole. The arrangement pitch of the north pole and the south pole can be set arbitrarily, and is set to, for example, 2 mm. Lastly, the base plate 7a is bonded to an undersurface of the second sheet 7c. A decorative laminate made of a non-magnetic stainless steel plate with a thickness of approximately 0.1 mm can also be bonded to the surface of the second sheet 7c.

The second sheet 7c of the magnetic scale 7 includes a rare-earth magnet and accordingly, generates a high magnetic flux density. The first sheet 7b functions as a back yoke of the second sheet 7c and functions as a yoke that concentrates magnetic lines of force generated from the second sheet 7c. The magnetic scale 7 generates a higher, more stable magnetic flux density from its surface than a magnetic scale using a ferrite magnet. Therefore, even if the magnetic scale 7 is covered with the plate cover 8, a magnetometer can measure the magnetic flux density of the magnetic scale 7.

Figure 5:
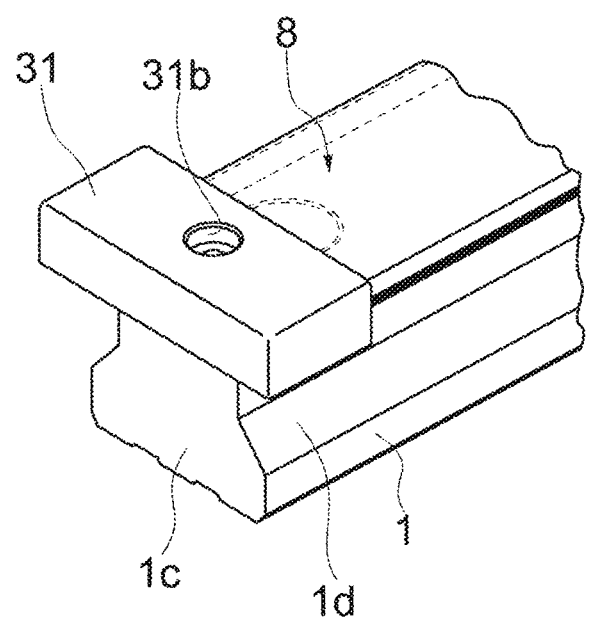
FIG. 5 is a perspective view illustrating an end cap covering an end of the track rail.
Figure 6A:
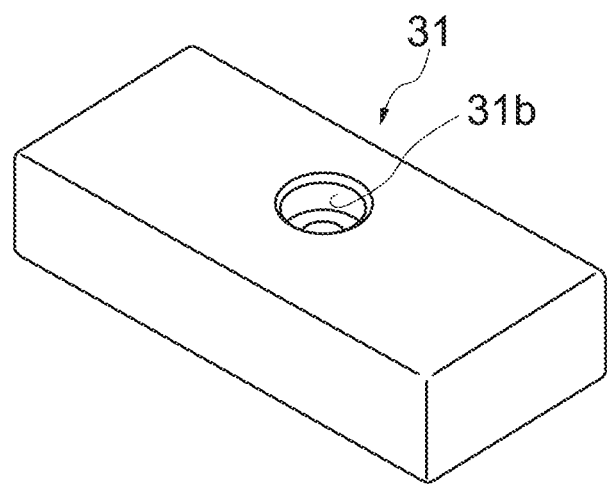
FIGS. 6(a) and 6(b) are detailed diagrams of the end cap (FIG. 6(a) illustrates a perspective view of an upper side of the end cap, and FIG. 6(b) illustrates a perspective view of a lower side of the end cap).
Figure 6B:
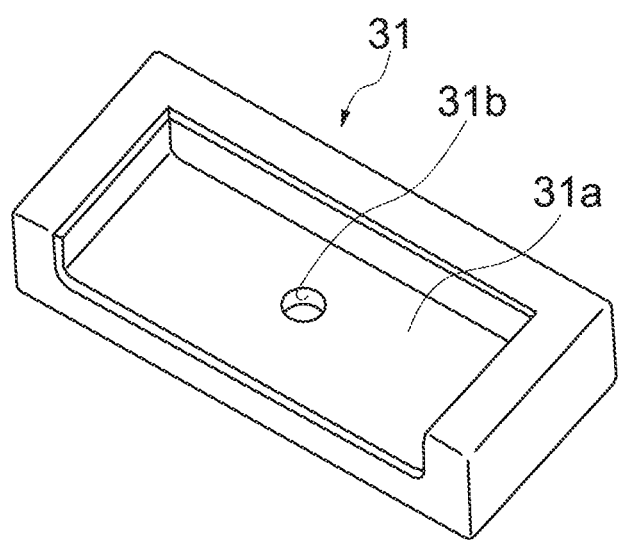

If the magnetic scale 7 is covered with the plate cover 8, it is possible to prevent coolant from entering the groove 1a accommodating the magnetic scale 7 from a widthwise end of the plate cover 8. In the embodiment, in order to prevent the coolant from entering the groove 1a accommodating the magnetic scale 7 from a lengthwise end of the plate cover 8, an end in the longitudinal direction of the track rail 1 is covered with an end cap 31 as an end cover member as illustrated in FIG. 5. FIG. 6(a) illustrates a perspective view of an upper side of the end cap 31. FIG. 6(b) illustrates a perspective view of a lower side of the end cap 31. The end cap 31 is formed into a cuboid shape having a larger width than that of the track rail 1. As illustrated in FIG. 6(b), a recess 31a whose shape is fitted to the track rail 1 is formed on an underside of the end cap 31. As illustrated in FIG. 5, the end cap 31 covers the upper surface of the plate cover 8 at the end in the longitudinal direction of the track rail 1, the groove 1a on an end surface 1c in the longitudinal direction of the track rail 1, the end surface 1c being continuous to the upper surface of the track rail 1, and parts of left and right side surfaces 1d of the track rail 1, the side surfaces 1d being continuous to the upper surface of the track rail 1. The end cap 31 is fixed to the track rail 1 by a screw. The plate cover 8 is sandwiched between the end cap 31 and the track rail 1. A through hole 31b through which a screw passes is formed in the end cap 31. A through hole 19 (refer to FIG. 1) through which a screw passes is also formed in the plate cover 8. The end cover member is simply required to cover at least the groove 1a in the end surface 1c in the longitudinal direction of the track rail 1. It is also possible to form the end cover member, by making the length of the plate cover 8 longer than that of the track rail 1 and bending the end of the plate cover 8.

Next, the structure of the movable block 2 is described. As illustrated in FIG. 1, the movable block 2 includes a movable block body 4 as a main body of a movable member, and end plates 5 as lid members attached to both ends in the moving direction of the movable block body 4.

The movable block body 4 includes a central portion 4a facing the upper surface of the track rail 1, and side wall portions 4b extended downward from both the left and right sides of the central portion 4a and facing the left and right side surfaces of the track rail 1. A structure that makes linear motion such as a table is attached to an upper surface of the movable block 2, using a mounting bolt. As illustrated in FIG. 2, a loaded roller rolling surface 4d as a loaded rolling element rolling portion facing the rolling element rolling portion of the track rail 1 is formed on the movable block body 4. Two loaded roller rolling surfaces 4d each facing the roller rolling surface 1b of the track rail 1 are formed on the side wall portion 4b of the movable block body 4.

A roller circulation path as a rolling element circulation path including the loaded roller rolling surface 4d is formed in the movable block 2. The roller circulation path includes the loaded roller rolling surface 4d facing the roller rolling surface 1b of the track rail 1, an unloaded return path 14 parallel to the loaded roller rolling surface 4d, and a direction change path connecting the loaded roller rolling surface 4d and the unloaded return path 14.

A plurality of rollers 3 is arranged in the roller circulation path of the movable block 2. The plurality of rollers 3 is rotatably held in series by a retainer 33. The rollers 3 are interposed between the roller rolling surface 1b of the track rail 1 and the loaded roller rolling surface 4d of the movable block body 4. When the movable block 2 moves relatively to the track rail 1, the rollers 3 make rolling motion while receiving a loaded roller rolling path 24 (between the roller rolling surface 1b and the loaded roller rolling surface 4d. Refer to FIG. 2). The roller 3, which has rolled to one end of the loaded roller rolling surface 4d of the movable block body 4, enters the unloaded return path 14 via the direction change path.

As illustrated in FIG. 1, a holder 35 that holds a head unit 34 is attached to the movable block 2. The head unit 34 includes a magnetometer 36 such as a magnetoresistive element, a Hall element, or the like that detects the magnitude of the magnetic flux density of the magnetic scale 7, and a printed board 37 including the magnetometer 36. An interpolator performs signal processing on the magnetic flux density detected by the magnetometer 36, which is transmitted to a driver that controls a motor, or the like.

The head unit 34 is molded in resin to seal the magnetometer 36 included on the printed board 37 in it. The head unit 34 is fixed to the holder 35 by a screw. When the head unit 34 is fixed to the holder 35, the magnetometer 36 is located above the magnetic scale 7. The head unit 34 adopts a sufficient waterproof structure with coolant resistant properties. The head unit 34 has a small and simple shape and accordingly can easily adopt a waterproof structure. The holder 35 to which the head unit 34 is mounted does not need to adopt a waterproof structure.

An unillustrated end seal, laminated contact scraper, a metal scraper, and the like are attached to an outer side in the moving direction of the holder 35. The end seal and the laminated contact scraper have the function of preventing foreign substances such as iron powder adhered to the surface of the plate cover 8 from entering the holder 35. The end seal and the laminated contact scraper contact the plate cover 8 with interference and remove foreign substances such as iron powder adhered to the surface of the plate cover 8. The contact area of the laminated contact scraper with the plate cover 8 is larger than the contact area between the end seal and the plate cover 8.

The metal scraper excludes foreign substances such as spatters sticking to the plate cover 8. The metal scraper does not contact the plate cover 8 so that there is a gap between the metal scraper and the plate cover 8.

It is also possible to interpose the end seal and the laminated contact scraper between the movable block and the holder. It is also possible to omit one of the end seal and the laminated contact scraper.

Up to this point, the structure of the motion guide apparatus of the embodiment has been described. The motion guide apparatus of the embodiment exerts the following effects: the plate cover 8 that covers the magnetic scale 7 also serves as the plate cover 8 that covers the through holes 18 of the track rail 1; accordingly, the iron powder adhered to the surface of the plate cover 8 can be scraped by the end seal, the laminated contact scraper, and the metal scraper; the end seal, the laminated contact scraper, and the metal scraper do not contact the magnetic scale 7 directly; accordingly, it is possible to prevent adverse effects such as wear and deformation on the magnetic scale 7.

A rare-earth magnet having a high magnetic flux density is used for the magnetic scale 7. Accordingly, even if the magnetic scale 7 is covered with the plate cover 8, the magnetic flux density of the magnetic scale 7 penetrates the plate cover 8. Hence, the magnetic flux density of the magnetic scale 7 can be measured with high accuracy. Furthermore, if the magnetic flux density of the magnetic scale 7 is high, the mounting position of the magnetometer 36 may be rough in terms of accuracy. Accordingly, the mounting of the magnetometer 36 is facilitated.

The groove 1a into which the magnetic scale 7 is fitted is formed between the plurality of through holes 18 in the upper surface of the track rail 1 and the widthwise end 21 of the upper surface of the track rail 1. Accordingly, the works of tightening and removing a bolt of the through hole 18 of the track rail 1 are facilitated. In contrast, if the magnetic scale 7 covers the through hole 18, it becomes impossible to access the bolt unless the magnetic scale 7 is removed.

The plate cover 8 includes the central portion 8a that covers the upper surface of the track rail 1 along the entire width direction orthogonal to the longitudinal direction, and the engagement portions 8b provided to both widthwise ends of the central portion 8a and bent along the central portion 8a. Accordingly, it is possible to prevent the entry of coolant from the widthwise ends of the plate cover 8.

The end cap 31 is provided to an end in the longitudinal direction of the track rail 1. The end cap 31 covers the groove 1a in the end surface in the longitudinal direction of the track rail 1. Accordingly, it is possible to prevent the entry of the coolant from the groove 1a at the lengthwise end of the plate cover 8. The coolant is prevented from flowing onto a contact surface between the magnetic scale 7 and the groove 1a of the track rail 1. Accordingly, it becomes possible to use double-sided tape and the like as the method for attaching the magnetic scale 7 to the track rail 1. Hence, the attachment of the magnetic scale 7 is facilitated.

Figure 7:
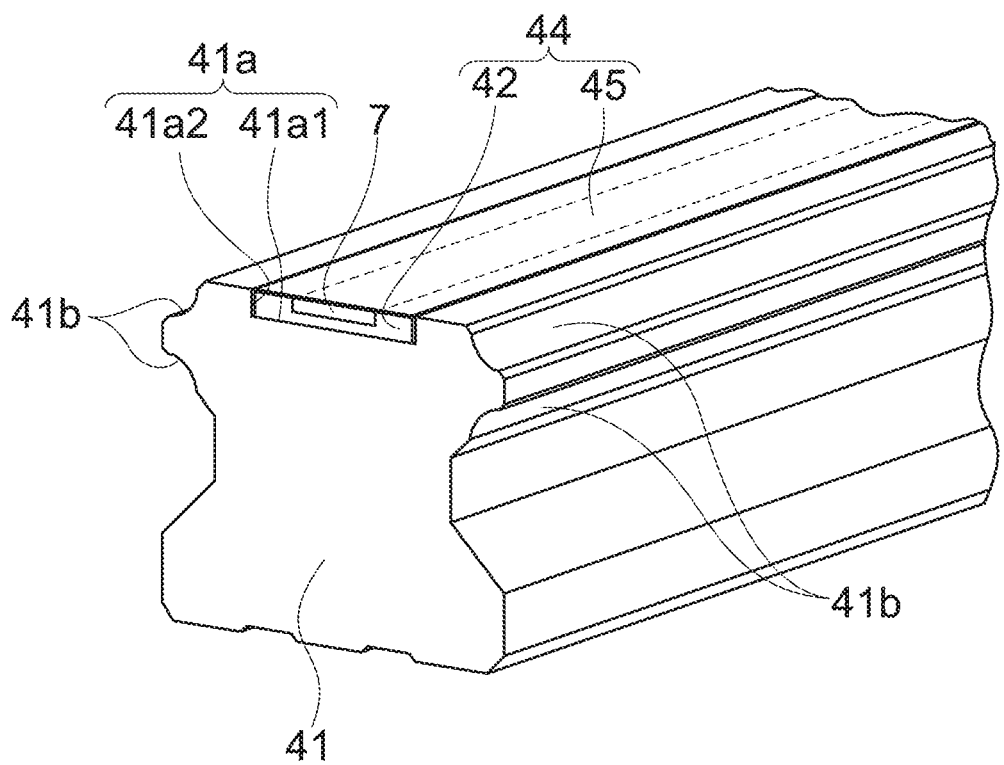
FIG. 7 is a perspective view of a track rail of a motion guide apparatus of a second embodiment of the present invention.
Figure 8:
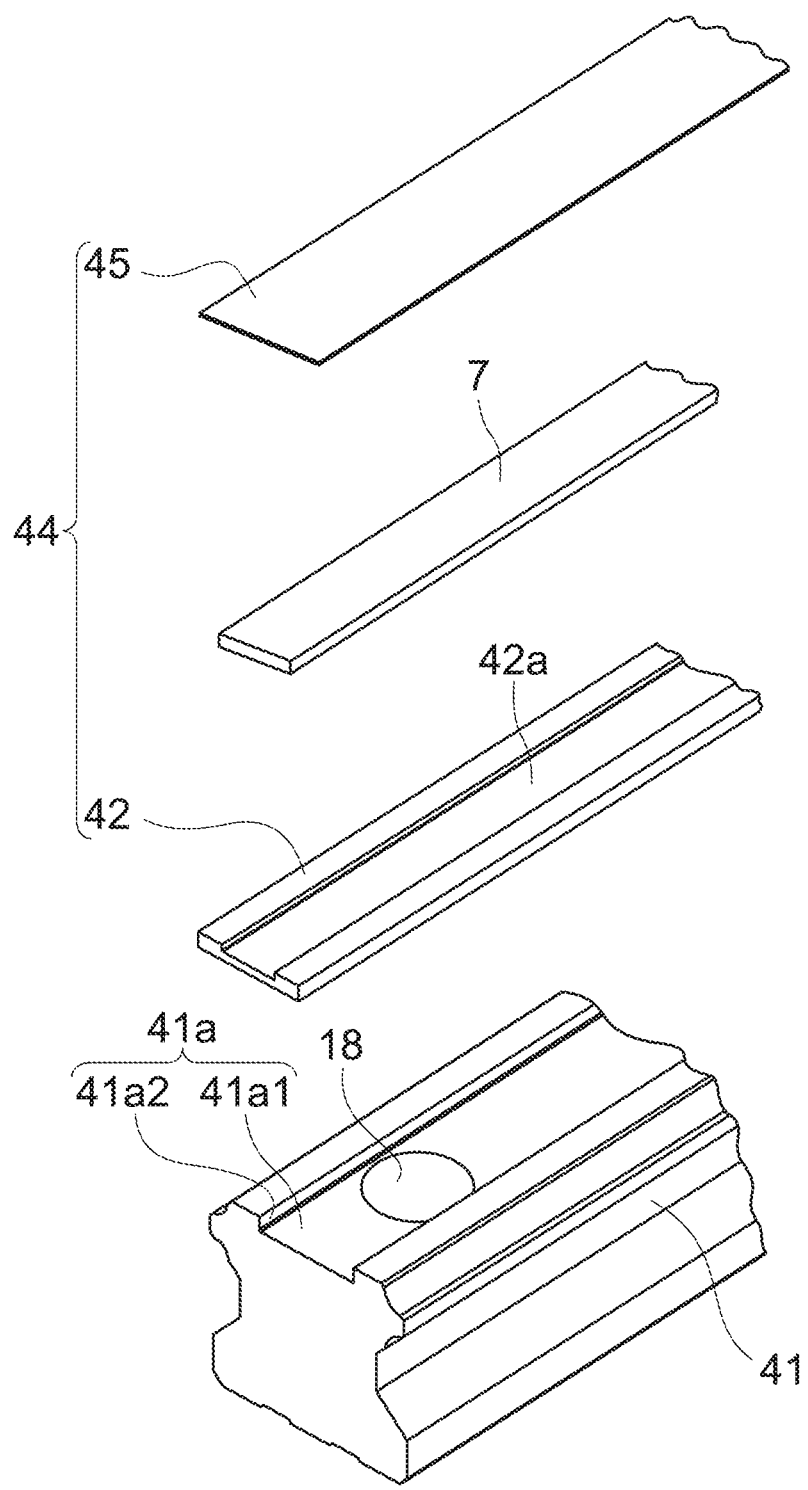
FIG. 8 is an exploded perspective view of the track rail of the motion guide apparatus of the second embodiment of the present invention.
Figure 9:
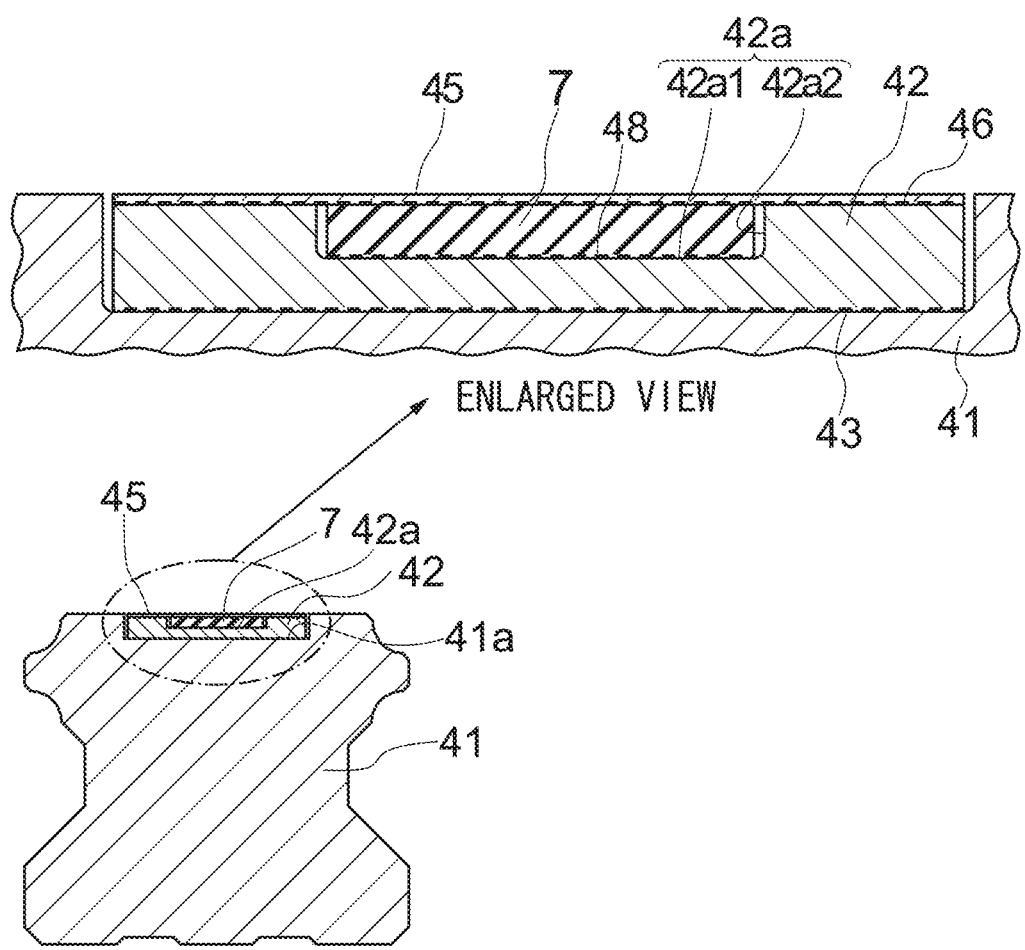
FIG. 9 is a cross-sectional view orthogonal to a longitudinal direction of the track rail of the motion guide apparatus of the second embodiment of the present invention.

FIGS. 7 to 9 illustrate a track rail 41 of a motion guide apparatus of a second embodiment of the present invention. In the motion guide apparatus of the embodiment, balls are used as rolling elements instead of the rollers. Ball rolling grooves 41b where the balls make rolling motion are formed as the rolling element rolling portions on the upper left and right side surfaces of the track rail. A ball circulation path including a loaded ball rolling groove facing the ball rolling groove 41b of the track rail 41 is formed in an unillustrated movable block.

As illustrated in FIG. 8, also in the motion guide apparatus of the second embodiment, a groove 41a extended in a longitudinal direction of the track rail 41 is formed in an upper surface of the track rail 41. The magnetic scale 7 is accommodated in the groove 41a. A cover member 44 covers the magnetic scale 7 and also covers the through holes 18 of the track rail 41.

As illustrated in the exploded perspective view of FIG. 8, the groove 41a of the embodiment is astride the plurality of through holes 18 of the track rail 41. The width of the groove 41a is larger than the countersink portion in the upper part of the through hole 18. The groove 41a includes a bottom surface 41a1 parallel to the upper surface of the track rail 41 and a pair of side surfaces 41a2 perpendicular to the bottom surface 41a1.

As illustrated in FIG. 7, the magnetic scale 7 is accommodated in the groove 41a. The configuration of the magnetic scale 7 is the same as that of the magnetic scale of the first embodiment. Accordingly, the same reference numerals are assigned and their descriptions are omitted. The lateral width of the magnetic scale 7 of the second embodiment can be made larger than the lateral width of the magnetic scale of the first embodiment. Hence, instead of the rare-earth magnetic powder, ferrite magnetic powder can also be used as the magnetic powder magnetized to the north pole and the south pole.

As illustrated in FIG. 8, the cover member 44 of the embodiment includes a main body portion 42 that is fit into the groove 41a of the track rail 41 to cover the plurality of through holes 18, and a lid body 45 that is mounted on the main body portion 42 to cover the magnetic scale 7.

The main body portion 42 is fitted into the groove 41a of the track rail 41. The main body portion 42 has a flat shape in cross section and is extended long and thin in the length direction of the track rail 41. The length of the main body portion 42 is equal to that of the track rail 41. The lateral width of the main body portion 42 is larger than the diameter of the countersink portion of the through hole 18. The main body portion 42 covers the through holes 18. The main body portion 42 is made of a non-magnetic metal, for example, stainless steel, or non-magnetic aluminum extrusion material. As illustrated in the enlarged view of FIG. 9, the main body portion 42 is bonded to the groove 41a of the track rail 41 by a double-sided tape 43.

A scale fitting groove 42a extended in a longitudinal direction of the main body portion 42 is formed in the main body portion 42. The scale fitting groove 42a includes a bottom surface 42a1 parallel to the upper surface of the main body portion 42 and a pair of side surfaces 42a2 perpendicular to the bottom surface 42a1. The magnetic scale 7 is fitted into the scale fitting groove 42a. The magnetic scale 7 is fixed to the scale fitting groove 42a by a double-sided tape 48. The height of the side surface 42a2 of the scale fitting groove 42a is higher than that of the magnetic scale 7. There is a difference in height between the upper surface of the magnetic scale 7 and the upper surface of the main body portion 42. In other words, there is a gap between the upper surface of the magnetic scale 7 and an undersurface of the lid body 45.

The upper surfaces of the magnetic scale 7 and the main body portion 42 are covered with the lid body 45. The lid body 45 is made of non-magnetic metal, for example, stainless steel. The width of the lid body 45 is the same as that of the main body portion 42, and is larger than that of the scale fitting groove 42a of the main body portion 42. The thickness of the lid body 45 is set to, for example, 0.2 to 0.4 mm. The lid body 45 is fixed to the main body portion 42 by a double-sided tape 46.

The motion guide apparatus of the second embodiment exerts the following effects: the cover member 44 that covers the magnetic scale 7 also serves as the cover member 44 that covers the through holes 18 of the track rail 41; accordingly, the end seal, the laminated contact scraper, and the metal scraper can scrape foreign substances such as iron powder adhered to the surface of the cover member 44; the end seal, the laminated contact scraper, and the metal scraper do not contact the magnetic scale 7 directly; accordingly, it is possible to prevent adverse effects such as wear and deformation on the magnetic scale 7.

The main body portion 42 of the cover member 44 supports the magnetic scale 7. Accordingly, it is possible to prevent the magnetic scale 7 from becoming depressed at the through holes 18.

The lid body 45 has a larger width than that of the scale fitting groove 42a of the main body portion 42 and is mounted on the surface of the main body portion 42. Accordingly, it is possible to prevent the coolant from flowing onto a contact surface between the magnetic scale 7 and the scale fitting groove 42a. The double-sided tape 48 can be used as the method for attaching the magnetic scale 7 to the main body portion 42. Accordingly, the attachment of the magnetic scale 7 is facilitated.

The present invention is not limited to the above embodiments. Various modifications can be made within the scope that does not change the gist of the present invention.

The upper surface of the track rail in the embodiments indicates a surface that, when a mounting surface of the track rail on the base is assumed to be an undersurface, is located on the opposite side to the mounting surface. The upper surface is not necessarily required to face upward when the motion guide apparatus is used. The movable block is simply required to be movable relatively to the track rail. The track rail may move upon use.

In the above embodiments, the example where the track rail is extended linearly in the longitudinal direction has been described. However, the track rail may be curved in an arc shape. The magnetic scale and the groove into which the magnetic scale is fitted may also be curved in an arc shape along the track rail.

The magnetic scale may be an incremental type or absolute type. It may be configured such that a magnet for return to the origin is provided in addition to the magnetic scale, the magnetometer detects the magnetic flux density of the magnet for return to the origin, and the origin can be detected.

In the above embodiments, the double-sided tape is used to bond the magnetic scale to the track rail. However, an adhesive can be used to bond the magnetic scale to the track rail, or a screw can be used to fix the magnetic scale to the track rail.

In the above embodiments, the magnetic scale is bonded to the groove of the track rail. However, the magnetic scale can be bonded to the plate cover.

The shapes of the track rail and the movable block are examples. Various shapes can be selected in accordance with the application of the motion guide apparatus. For example, the number of rolling element rolling portions of the track rail can be set to two, or the rolling element rolling portion can be placed on the upper surface of the track rail.

The present description is based on Japanese Patent Application No. 2013-186015 filed on Sep. 9, 2013, the whole content of which is incorporated herein.

REFERENCE SIGNS LIST 1 track rail (track member)
1a groove
2 movable block (movable member)
7 magnetic scale
8 plate cover (cover member)
8a central portion
8b engagement portion
21 widthwise end of an upper surface of the track rail
31 end cap (end cover member)
41 track rail (track member)
41a groove
42 main body portion
42a scale fitting groove
44 cover member
45 lid body

The invention claimed is:

1. A magnetic-scale-equipped motion guide apparatus comprising:
a track member including a rolling element rolling portion extended in a longitudinal direction, and an upper surface where at least one through hole into which a fastening member is inserted opens;
a movable member movably assembled to the track member via a plurality of rolling elements;
a groove formed in the track member and extended in the longitudinal direction;
a magnetic scale accommodated in the groove, on which north and south poles are alternately formed in the longitudinal direction; and
a cover member covering the magnetic scale,
wherein the cover member that covers the magnetic scale also serves as the cover member that covers the through hole of the track member.

2. The magnetic-scale-equipped motion guide apparatus according to claim 1, wherein the magnetic scale includes a rare-earth magnet magnetized to the north and south poles.

3. The magnetic-scale-equipped motion guide apparatus according to claim 1, wherein the groove is formed between a plurality of through holes in the upper surface of the track member and a widthwise end of the upper surface of the track member.

4. The magnetic-scale-equipped motion guide apparatus according to claim 1, wherein the cover member includes
- a central portion covering the upper surface of the track member along the entire width direction orthogonal to the longitudinal direction, and
- engagement portions provided at both widthwise ends of the central portion and bent along the central portion.

5. The magnetic-scale-equipped motion guide apparatus according to claim 1, wherein the cover member includes
- a main body portion fitted into the groove of the track member to cover a plurality of through holes of the track member, the main body portion having a scale fitting groove into which the magnetic scale is fitted, and
- a lid body covering the magnetic scale fitted into the scale fitting groove.

6. The magnetic-scale-equipped motion guide apparatus according to claim 1, further comprising an end cover member covering the groove or the scale fitting groove in an end surface in the longitudinal direction of the track member, the end surface being continuous to the upper surface of the track member.

* * * * *